United States Patent
Spadaro

(10) Patent No.: US 6,465,736 B1
(45) Date of Patent: Oct. 15, 2002

(54) HEAVY ELECTRICAL FIXTURE CEILING BRACE

(76) Inventor: Jerry J. Spadaro, 44 Nottingham Way, Middletown, NJ (US) 07748

( * ) Notice: Subject to any disclaimer, the term of this patent is extended or adjusted under 35 U.S.C. 154(b) by 0 days.

(21) Appl. No.: 09/838,731

(22) Filed: Apr. 20, 2001

(51) Int. Cl.[7] ................................. H02B 1/30
(52) U.S. Cl. ......................... 174/61; 174/63; 248/343
(58) Field of Search .............................. 174/50, 58, 63, 174/61; 52/39; 248/343, 906; 416/244; 220/3.2, 3.3, 3.9; 362/404

(56) References Cited

U.S. PATENT DOCUMENTS

| | | | | |
|---|---|---|---|---|
| 5,522,577 A | * | 6/1996 | Roesch | 248/343 |
| 5,873,556 A | * | 2/1999 | Reiker | 248/906 X |
| 5,900,583 A | * | 5/1999 | Russo | 174/61 |
| 5,916,094 A | * | 6/1999 | Gretz | 52/39 |
| 5,939,671 A | * | 8/1999 | Gretz | 174/50 |
| 6,237,884 B1 | * | 5/2001 | Howe | 248/343 X |

* cited by examiner

Primary Examiner—Anthony Dinkins
Assistant Examiner—Dhiru R. Patel
(74) Attorney, Agent, or Firm—Charles I. Brodsky

(57) ABSTRACT

A horizontally extending brace secured across ceiling beams is coupled with an externally threaded metal rod whose lower ends extend into an electrical box rated at a given weight limit to thread with a reducing coupler at one end, at an opposite end of which a nipple is arranged to thread, with the nipple receiving the electrical cables passing upwardly from an electrical fixture connected with it, such that the weight of the fixture threaded to the nipple is supported substantially only by the coupler, the nipple, the metal rod and the horizontally extending brace, and not by the electrical box.

14 Claims, 3 Drawing Sheets

HEAVY ELECTRICAL FIXTURE CEILING BRACE

FIELD OF THE INVENTION

This invention relates to the hanging of electrical fixtures and, more particularly, to the hanging of residential electrical fixtures of weight of the order of hundreds of pounds.

BACKGROUND OF THE INVENTION

As is well known and understood, in conventional residential construction, electrical boxes rated at 50–60 lb. limit are commonly employed. As is also understood, it is the usual practice to use such electrical boxes even where the fixture to be hung weighs far more than the rating limit. In those instances, the typical procedure is for the builder to simply screw the electrical box into a 2×4 traversing the ceiling beams, representing to the homeowner that this is an acceptable "re-enforcement" to take the added weight. However, and as will be appreciated, besides that method continuing to be one where the electrical box is substantially the only thing to support the weight of the fixture, such installation violates the accepted Electrical Codes which require that electrical fixtures in excess of 50 lbs. be independently suspended by the structural steel or wood framing—and not by the electrical box. Although such departure from the Codes may not be recognized by the homeowner, its effects are readily observable once the fixture comes crashing down—especially from very high ceilings, where such large fixtures as chandeliers are frequently installed.

SUMMARY OF THE INVENTION

As will become clear from the following description, a heavy electrical fixture hanging installation according to the present invention is one in which the electrical box supports none of the weight of the fixture—so that its overloading does not occur. Thus satisfying the various Electrical Codes, the installation of the invention follows from its use of a horizontally extending brace, an externally threaded metal rod (preferably fabricated of steel), a threaded reducing coupler and a nipple—with the coupler being wholly within the electrical box and with the nipple extending only slightly outwardly therefrom.

In particular, the installation includes the brace secured across the ceiling beams in angular alignment therewith, with the brace including first and second co-axial apertures on its opposing top and bottom surfaces. An externally threaded metal rod extends through both apertures, with its lower end extending into the electrical box to mate with a first internal thread of the coupler which is wholly within the electrical box. A second internal thread of the coupler (of lesser diameter than the first internal thread) receives the threads of the nipple—to which the electrical fixture is connected and through which its electrical cables upwardly pass. A pair of apertures on the sides of the coupler receive these cables in making the ultimate electrical connection with the fixture.

In a preferred embodiment of the invention, the externally threaded metal rod is selected of a length and diameter to support the weight of an electrical fixture greater than the rated weight limit of the electrical box. When fabricated of steel, for example, such externally threaded rod is selected of a length and diameter to support the weight of a fixture several times in excess of the general 50–60 lb. weight limit to which the commonly employed electrical box is rated. With the length of the externally threaded rod being adjustable (i.e., for raising a fixture towards or lowering it away from the ceiling), a steel rod of such type has been found effective in supporting the weight of electrical fixtures up to 300 lb., 400 lb., 500 lb., and more. Essentially, the steel rod is able to support whatever weight the ceiling beams to which the horizontal brace is secured is able to withstand.

In further accordance with the invention—to provide sufficient strength for supporting very heavy electrical fixtures—a reducing coupler substantially 2 in. in length is employed, wholly enclosed within the electrical box. With the nipple extending slightly outwardly therefrom, approximately ½ in., a somewhat deeper electrical box is employed—of 2¼ in. depth, for example. With the horizontally extending brace further including a pair of adjustable arms slidable along the brace and lockable for securement to the perpendicularly arranged ceiling beams, the installation of the invention becomes effective in supporting the weight of the heavy electrical fixture substantially only by the reducing coupler, the nipple, the threaded metal rod and the horizontally extending brace. In effectuating this, the reducing coupler of the invention will be seen to include a pair of internally threaded sections, each some ¾ in. long—with the first mating with the threaded metal rod, and with the second mating with the threads of the nipple.

BRIEF DESCRIPTION OF THE DRAWINGS

These and other features of the present invention will be more clearly understood from a consideration of the following description, taken in connection with the accompanying drawings, in which.

DETAILED DESCRIPTION OF THE INVENTION

Figure 1:
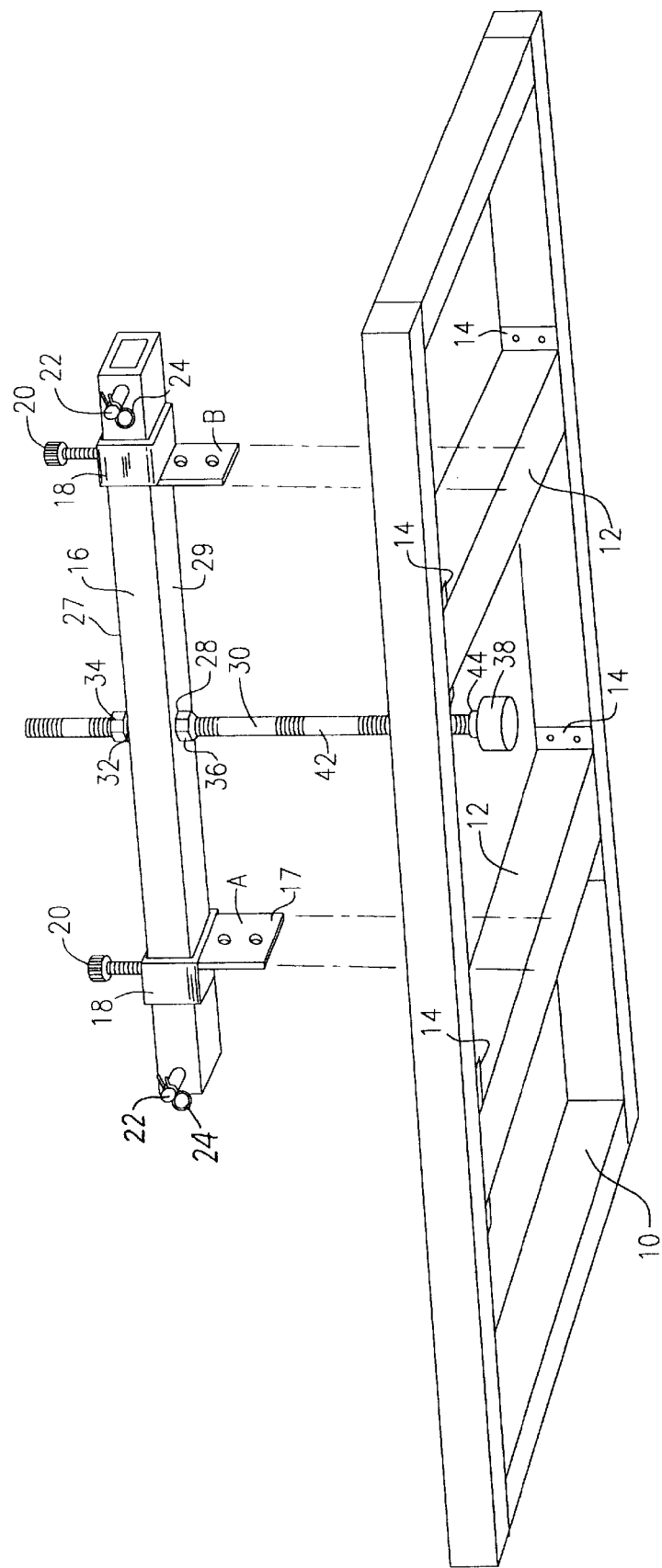
FIGS. 1 and 2 are over-and-under views respectively of ceiling framing showing the installation of a heavy electrical fixture support brace according to the invention.
Figure 2:
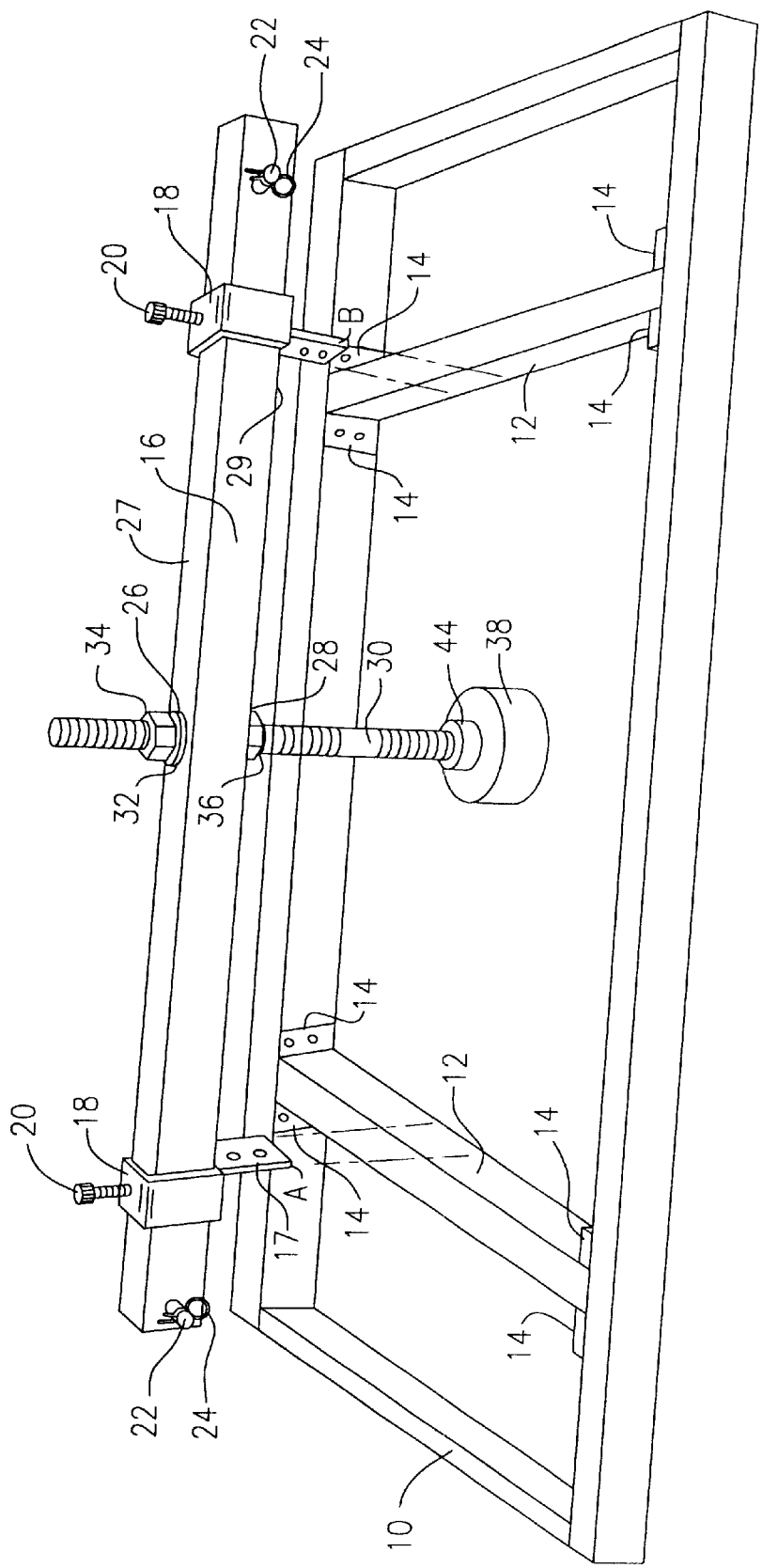
Figure 3:
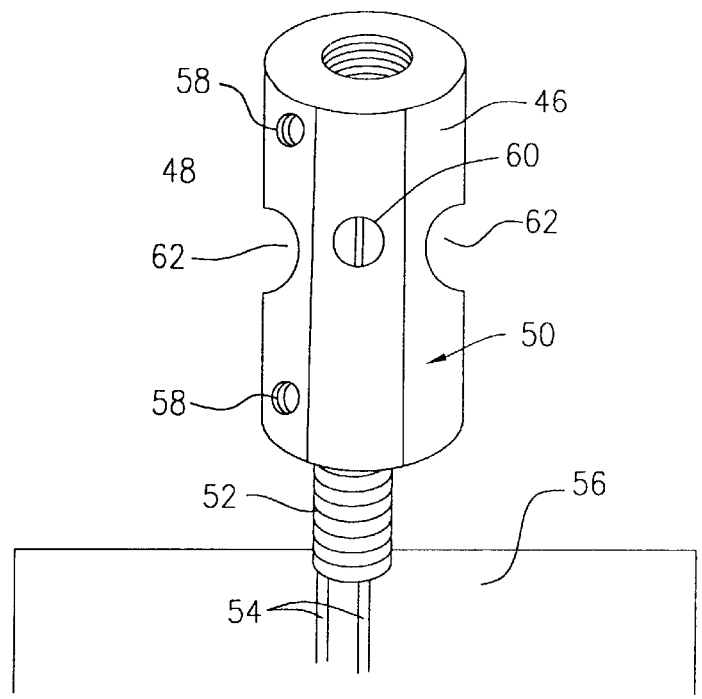
FIGS. 3–5 are views helpful in an understanding of the reducing coupler, nipple and electrical box components of the support brace.
Figure 4:
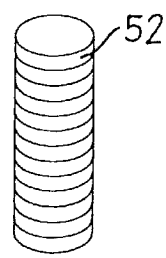
Figure 5:
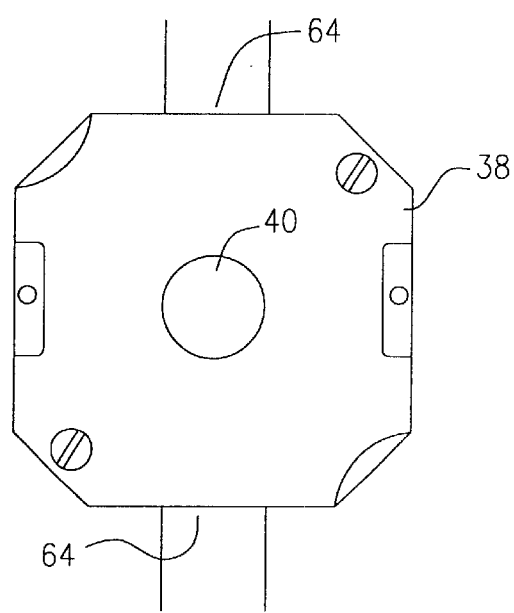

In FIGS. 1 and 2, the ceiling framing beams to which the support brace of the invention is secured is shown generally by the reference numeral 10, as including joists 12 and hangers 14. A horizontally extending brace 16 is secured across the beams 10 in angular alignment therewith, preferably perpendicular. A pair of adjustable arms 18 slide along the brace 16, and lock with it by means of hex screws 20 (for example), along with a pair of cotter pins 22 receiving springs or clips 24 to retain the arms 18 on the brace. First and second coaxial apertures 26, 28 are included on the opposing top and bottom surfaces 27, 29 of the brace 16, and the arms 18 are slidable to set the brace in position on the ceiling framing by bolting them to the joists 12 at A and B.

An externally threaded metal rod 30 (preferably of steel) extends through the apertures 26, 28—by means of a lock washer 32 and overlying nut 34 at the top surface 27, with a nut 36 underlying the bottom surface 29. As indicated, the adjustable arms 18 extend downwardly from the brace 16, and include apertures 17 for receiving the bolt, screw or similar like fastener to secure the brace 16 with the ceiling beams 10. An electrical box 38 is included, rated at a given weight limit—such as 50–60 lbs.—and includes an opening 40 to receive a lower end 42 of the rod 30. A third nut 44 secures the rod 30 with the electrical box 38.

The metal rod 30—solid in accordance with this embodiment of the invention—extends downwardly into an upper section 46 of a reducing coupler 48 having a first internal thread of diameter to mate with the threads at the lower end 42 of the rod 30. The coupler 48 includes a lower section 50 of lesser internal thread diameter, to mate with a nipple 52 of external diameter thread. In joining with the coupler 48, the nipple 52 is selected hollow, to pass upwardly the electrical cable of the electrical fixture to be connected. Such cables are indicated at 54, with the fixture being generally identified by the reference numeral 56. Set screws 58 secure the nipple 52 with the coupler 48, with the screw 60 on the reducing coupler serving as a ground terminal. The cables 54 pass through apertures 62 in the sides of the coupler 48 to connect with electrical power wiring fed into the electrical box in conventional manner, as through openings 64.

In accordance with the invention, the length and diameter of the externally threaded metal rod 30 is selected to support the weight of an electrical fixture coupled to the nipple 52. This follows—and, additionally, in the case of a fixture which weighs several times the rated weight of the electrical box 38—by virtue of the weight of the fixture being supported substantially only by the reducing coupler 48, the nipple 52, the rod 30 and the horizontally extending brace 16. It will be appreciated, that none of the weight is supported by the electrical box 38—so that the support brace of the invention can hold as much weight as the ceiling frame beams can tolerate. As will be appreciated, to fully utilize the advantages offered by a metal rod in this manner, a diameter for the rod of ¾ in. is selected according to the invention, and with the coupler 48 designed so that its upper section 46 threads with the rod 30 a sufficient distance to hold it. Such linear distancing applies equally as well with respect to the lower section 50 of the coupler 48, in threading with the nipple 52—and to effectuate this, both sections 46 and 50, according to the invention, are selected of some ¾ in. length each. The apertures 62 of the reducing coupler are chosen of a diameter of ½ in. each, thereby resulting in a coupler 48 of overall length of some 2 in. For cosmetic purposes, the nipple 52 should extend outwardly from the electrical box 38 only slightly, so that the electrical box employed with the invention can be selected of substantially 2¼ in. depth—for use with a nipple of 1½ in. length. As will be understood, that length for the nipple 52 adds to the strength feature of the support brace by threading into the lower section 50 of the coupler 48 a sufficient length to secure with it. In any event, the electrical fixture will thus be seen to be supported substantially only by the coupler 48, the nipple 52, the rod 30 and the brace 16—alone, and without the box 38—which encloses the cable connections. By selectively loosening and tightening the nut 34, the length of the metal rod 30 extending through the brace 16 can be adjusted to raise or lower the fixture 56 with respect to the ceiling beams, as desired.

While there have been described what are considered to be preferred embodiments of the present invention, it will be readily appreciated by those skilled in the art that modifications can be made without departing from the scope of the teachings herein. Thus, whereas a "shallower" electrical box 38 could be employed instead of the 2¼ in. box described above, so doing would, of necessity, require a reduction in the overall length of the coupler 48, or the length of its upper section 46 or its lower section 50, or by reducing the length of the nipple 52, thereby reducing the weight the individual threadings could support. Alternatively, leaving the dimensions unchanged only extends the nipple 52 further outwardly from the electrical box 38—detracting from the desired appearance presented. While such modifications will be understood to impair somewhat the advantages attendant with the present invention, by using a deeper electrical box for the invention, yet an additional advantage follows from the ability to then use a "fan box" as the box 38, to support a large fan as the electrical fixture, instead of a chandelier. An installation with the deeper box 38 thereby allows a greater selection in the type of electrical fixture to be supported by the ceiling brace, and thereby extends the usefulness of the invention. For at least such reason, therefore, resort should be had to the claims appended hereto for a true understanding of the scope of the invention.

I claim:

1. The combination comprising:
   a horizontally extending brace secured across ceiling beams angularly aligned with respect thereto;
   first and second co-axial apertures on opposing top and bottom surfaces of said brace;
   an externally threaded metal rod extending through said first and second apertures;
   an electrical box rated at a given weight limit and having an opening receiving a lower end of said threaded rod;
   a coupler within said electrical box having a first internal thread of diameter to mate with threads at said lower end of said rod, and also having a second internal thread of lesser diameter;
   a threaded nipple of external diameter to mate with said second internal thread of said coupler, while extending slightly outwardly of said electrical box;
   with said coupler also having a pair of apertures on sides thereof receiving electrical cables passing upwardly through said nipple from an electrical fixture connected thereto;
   and characterized in that weight of said fixture threaded to said nipple is supported substantially only by said coupler, said nipple, said metal rod and said brace.

2. The combination of claim 1 wherein said threaded metal rod is of a length and diameter to support the weight of said electrical fixture in excess of said given weight limit.

3. The combination of claim 2 wherein said threaded rod is of a length and diameter to support the weight of said electrical fixture several times in excess of said given weight limit.

4. The combination of claim 2 wherein said electrical box is rated at a 50–60 lb. weight limit and wherein said threaded metal rod is of a length and diameter to support the weight of said electrical fixture several times in excess of 50–60 lb.

5. The combination of claim 2 wherein said threaded metal rod is of a substantially ¾ inch diameter.

6. The combination of claim 2 wherein the length of said threaded metal rod is adjustable.

7. The combination of claim 2 wherein said coupler is of a substantially 2 inch length.

8. The combination of claim 7 wherein said threaded nipple is of substantially ½ inch outside diameter.

9. The combination of claim 8 wherein said first and second internal threads of said coupler extend substantially ¾ inch in length each.

10. The combination of claim 9 wherein said pair of apertures on said coupler are of a diameter of substantially ½ inch.

11. The combination of claim 8 wherein said electrical box is of a substantially 2¼ inch depth.

12. The combination of claim 7 wherein said threaded nipple is of substantially 1½ inch length.

13. The combination of claim 2 wherein said horizontally extending brace includes a pair of adjustable arms slidable along said brace, and lockable for securement to ceiling beams in perpendicular alignment with respect to said brace.

14. The combination of claim 13 wherein said externally threaded metal rod is fabricated of steel.

* * * * *